United States Patent [19]

Herrmann et al.

[11] Patent Number: 5,053,459

[45] Date of Patent: Oct. 1, 1991

[54] AB BLOCK COPOLYMERS BASED ON BUTADIENE, ISOPRENE AND STYRENE

[75] Inventors: Christoph Herrmann, Marl; Walter Hellermann, Dorsten; Hans-Bernd Fuchs; Karl-Heinz Nordsiek, both of Marl; Juergen Wolpers, Haltern, all of Fed. Rep. of Germany

[73] Assignee: Huls Aktiengesellschaft, Marl, Fed. Rep. of Germany

[21] Appl. No.: 359,393

[22] Filed: May 31, 1989

[30] Foreign Application Priority Data

Jun. 3, 1988 [DE] Fed. Rep. of Germany ....... 3818870

[51] Int. Cl.$^5$ ...................... C08L 53/02; C08F 297/04
[52] U.S. Cl. ........................................ 525/99; 525/98; 525/232; 525/237; 525/250; 525/314; 525/332.8; 152/209 R
[58] Field of Search ................... 525/98, 99, 314, 914, 525/250, 232, 237, 332.8; 526/180, 181

[56] References Cited

U.S. PATENT DOCUMENTS

| | | | |
|---|---|---|---|
| 3,780,139 | 12/1973 | Sutter et al. | 526/88 X |
| 4,673,709 | 6/1987 | Nordsiek et al. | 525/99 |
| 4,814,386 | 3/1989 | Hellermann et al. | 525/258 |

*Primary Examiner*—Fred Teskin
*Attorney, Agent, or Firm*—Oblon, Spivak, McClelland, Maier & Neustadt

[57] ABSTRACT

An unsaturated elastomeric AB block copolymer comprising 20–75 wt. % 1,3-butadiene monomer units; 5–50 wt. % isoprene monomer units; and 3–30% wt. % styrene monomer units; wherein said block copolymer contains less than 3 wt. % styrene blocks, each of said block A and block B contain all three of said monomer units, said copolymer comprises 30–90 wt. % of block A and 70–10 wt. % of block B, and wherein the average vinyl and isopropenyl content of block B are each at least 30% higher than those of block A; and a method for preparing the unsaturated AB block copolymer.

8 Claims, 2 Drawing Sheets

AB BLOCK COPOLYMERS BASED ON BUTADIENE, ISOPRENE AND STYRENE

BACKGROUND OF THE INVENTION

1. Field of the Invention

The present invention relates to unsaturated elastomeric AB block copolymers based on butadiene, isoprene and styrene, their manufacture and their use for the manufacture of tire treads.

2. Discussion of the Background

It is generally accepted that rubbers which are to be employed in tire making must satisfy the following requirements:

(a) The rubbers must be readily processible in subsequent tire tread manufacture.
(b) The rubbers must be readily vulcanizable.
(c) The rubbers must be conveniently manufactured.

In addition, special requirements have to be complied with which arise from their particular application in tire making. It is well known that in recent times increased demands are being made on the properties of tire treads such as:

(d) They are required to remain highly resilient even at low temperatures.
(e) They must exhibit good anti-skid properties in wet conditions.
(f) They are required to have high abrasion resistance to provide a correspondingly long life expectancy.
(g) When subjected to dynamic loads they should generate as little heat as possible. Their rolling resistance should be as low as possible in order to keep the fuel consumption of the vehicle as low as possible.

They should be either main components of tire tread blends and comply with the aforesaid requirements as such or constitute one of several components of tire tread mixtures and comply in particular with the requirement of high skid resistance without adversely affecting the rolling resistance to a noteworthy degree.

It is known that rubbers, when subjected to the torsional vibration test exhibit a temperature dependency of the logarithmic decrement of mechanical damping which when expressed as a graph, yields a graph configuration which is characteristic for the particular rubber. The desired requirements for tire treads are met in particular if the damping curve comprises a vibration damping range which is as wide as possible (See K. H. Nordsiek. Kautschuk und Gummi, Kunstoffe 38, 178 (1985) and 39, 599 (1986). This applies both to a simple rubber component and to mixtures of rubbers.

It is also known that these partly contradictory properties of tire threads are determined to a substantial extent by the nature and composition of the rubbers employed for this purpose. Homopolymers based on the conventionally employed monomeric raw materials such as butadiene, isoprene and styrene do not yet meet these requirements satisfactorily (See EP-OS 0 054 204 and JP-OS 82/87 406), nor do copolymers based on two such monomers.

For purposes of this invention, the meaning of blocks of a polymer is not restricted only to chain segments composed of different monomeric building elements, but also includes those segments which, dictated by the extraneous process parameters, exhibit abrupt variations in their nature of interlinking of the monomeric building elements.

Even if during the copolymerization of dienes and styrene, the styrene proportion is changed (See DE-OS 31 08 583) no block copolymers are attained, but merely a gradual transition. The desired improvement of tire technological properties is still inadequate, even in that case. Single phase rubber systems are described in DE-OS 31 08 583 comprising a damping maximum created by a glass transition point in a very narrow temperature range.

An improvement is attained only by virtue of a copolymer being produced comprising two different blocks A and B which differ in their structure and/or composition.

The rubber materials described in DE-PS 31 51 139 contain a styrene-butadiene block copolymer, the two blocks of which have different glass transition temperatures; the damping phase of these rubber materials exhibits a single maximum only. DE OS 32 20 680 similarly describes rubber materials which contain a block copolymer formed by a conjugated diolefin and monovinyl substituted aromatic hydrocarbons, but contains no teaching by which a wide damping curve can be attained. The rubbers do not yet satisfy the above-mentioned criteria (d) –(g) adequately.

Tire treads are described in EP-OS 0 173 791, the rubber component of which may be composed to 30 to 100% of block copolymers based on butadiene, isoprene and optionally styrene and/or piperylene. The block copolymers are produced in the presence of co-catalysts by increasing the temperature and may, for example, comprise an AB structure. The polymers always contain a terminal block based on butadiene which is formed at increased temperatures and which accordingly comprises a comparatively high content of 1,2 structural units and an uneven distribution of the vinyl groups. The rubbers described in German patent application P 37 24 871 are AB-block copolymers based on butadiene, isoprene and styrene. Both processes appear to be cumbersome, because for the manufacture of both blocks special monomer mixtures must in each case be prepared.

SUMMARY OF THE INVENTION

Accordingly, one object of the present invention is AB block copolymers based on isoprene, butadiene and styrene which will provide a damping curve with a vibration damping region of greater or lesser width so that they can be used correspondingly either as a main or a subsidiary component of rubber mixtures. A further important object of the invention is the provision of a simple process for the manufacture of such AB block copolymers.

Surprisingly AB block copolymers have now been found, based on 20 to 75% butadiene, 5 to 50% isoprene and 3 to 30% styrene, wherein each of the two blocks includes units of all three monomers.

These block copolymers comprise:
30 to 90% of a block A, and
70 to 10% of a block B, the average vinyl and isopropenyl group contents of which are each at least 30%, more particularly at least 45% higher than that of block A.

Preferably the AB-block copolymer is composed of 40 to 80% of the block A and of 60 bo 20% of the block B.

The vinyl and isopropenyl groups may be distributed either statistically or with an increasing or decreasing gradient along the chain. The proportion of these groups in block A preferably amounts to 10 to 30% each.

The AB block copolymers may be linear or may be branched. Such branching can be attained by means of a branching agent during the polymerization or by means of a coupling agent towards the end of the polymerization.

The process for the manufacture of the block copolymers by anionic polymerization of the monomers in an inert organic solvent in the presence of a Li-organic compound is characterized in that initially a block A is produced by polymerization of a preblended mixture of the three monomers, optionally in the presence of a small amount of a co-catalyst. Thereafter a block B is produced in that a mixture, optionally different, of the three monomers is polymerized by the addition of a co-catalyst.

Finally, the invention also relates to the use of the AB block copolymers for the manufacture of tire treads.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
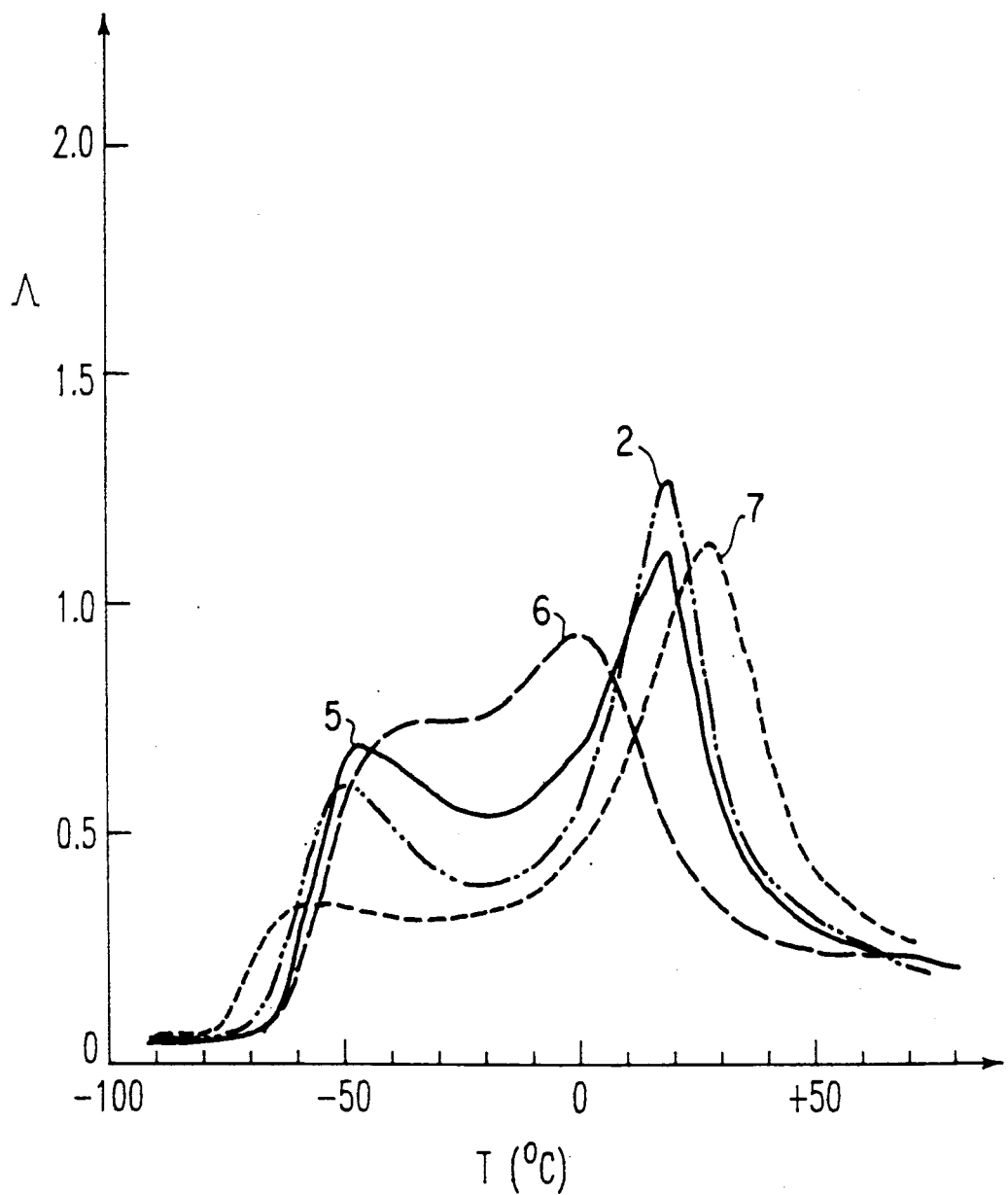
FIGS. 1 and 2 show the dampening curves for Comparative Examples A and C and Examples 2 and 5–7.
Figure 2:
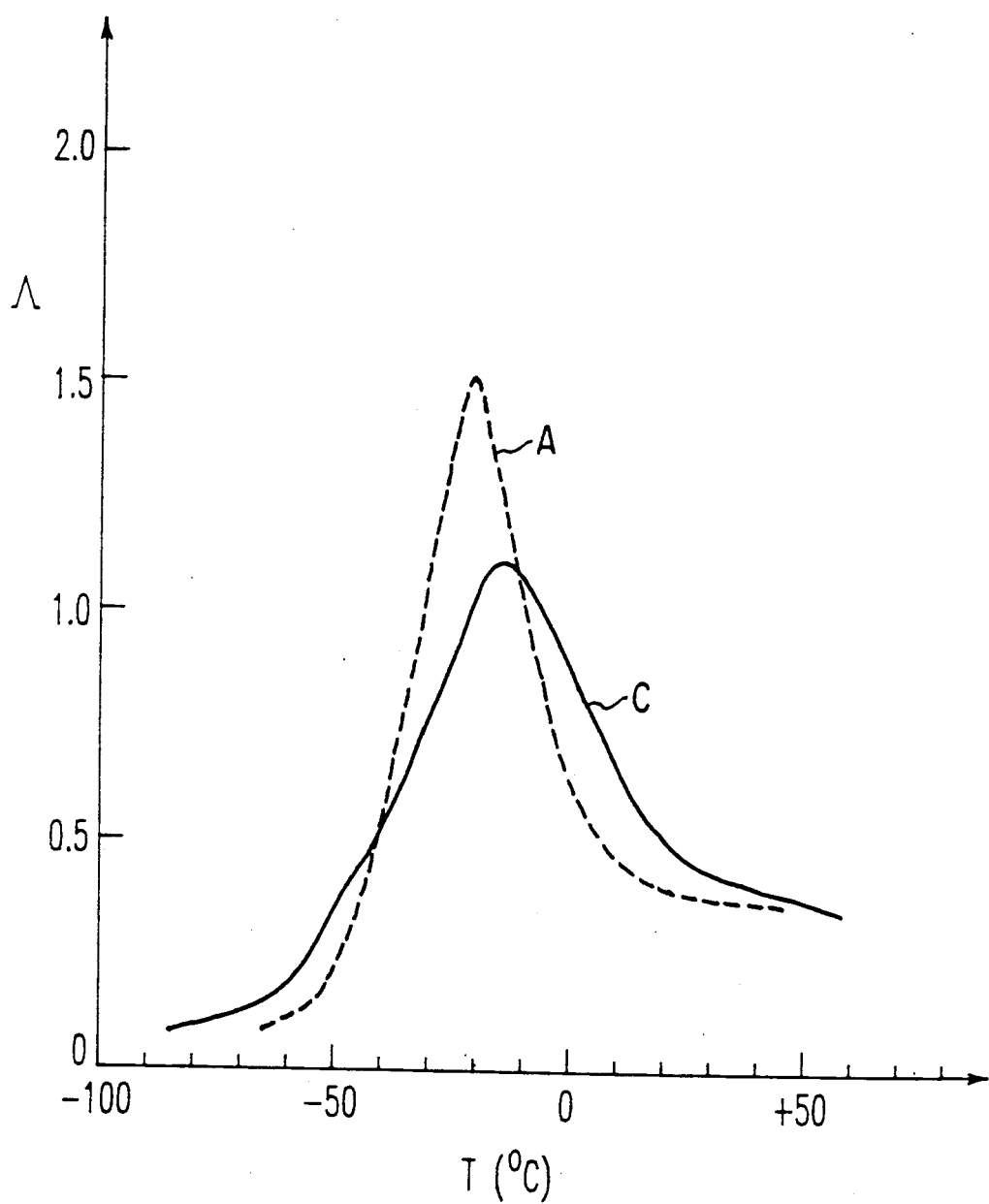

The block copolymers according to the invention are valuable components of rubber mixtures for tire treads. Solely by varying the addition of the co-catalyst, it is possible at will to produce block copolymers having a more or less wide maximum of the damping curve. Accordingly, the process is extremely simple and flexible.

From German patent application P 37 24 871.5 unsaturated elastomeric AB-block copolymers based on butadiene, isoprene and styrene are known. The block A is composed either of butadiene units or of butadiene and styrene units or of butadiene and isoprene units, but can never comprise all three monomers. This requirement distinguishes the copolymers of the German application from the copolymers of the present application in which the block A, in the same manner as the block B, must contain all three monomers.

An inert organic solvent is employed as the reaction medium. Hydrocarbons having 6 to 12 carbon atoms such as pentane, hexane, heptane, octane and decane and their cyclic analogues are particularly suitable. Aromatic solvents, e.g. benzene, toluene, xylene and others are also suitable. It stands to reason that mixtures of the aforementioned solvents may also be employed.

Alkyl lithium compounds which can readily be obtained by the reaction of lithium with the corresponding alkylhalides are employed as catalysts. The alkyl moieties contain from 1 to 10 carbon atoms. Individual hydrogen atoms may be substituted by phenyl moieties. The following alkyl lithium compounds are particularly suitable: methyllithium, ethyllithium, pentyllithium, and n-butyllithium which is particularly preferred.

In order to improve the cold flow properties, at least one polymerization stage is preferably carried out in the presence of small amounts of a branching agent, e.g. divinylbenzene (DVB). Not more than 0.5 parts DVB based on 100 parts monomer are employed. Such addition is dispensed with if, after the polymerization, a coupling reaction is provided.

The nature and amount of catalyst and branching agent are preferably so selected that the block copolymer obtained has the following properties:

Mooney viscosity (ML1-4, 100° C. DIN 53 523): 35 to 120;

Non-uniformity $U = (M_w/M_n) - 1$, determined by gel permeation chromatographic analysis (GPC analysis): 0.6 to 3.0;

Defo elasticity (80° C., DIN 53 514): 20;

In the present process block B is prepared in the presence of a cocatalyst.

The object is to obtain polymers having the highest possible content of 1,2 and/or 3,4-structural units in block B.

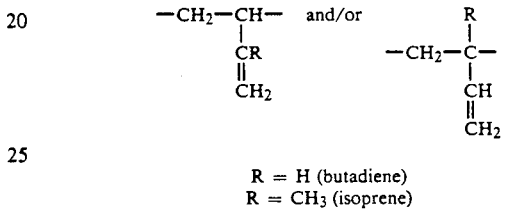

R = H (butadiene)
R = CH$_3$ (isoprene)

Thus the co-catalysts are selected in accordance with their ability to control the microstructure, i.e. the manner in which the polymerization proceeds in respect to directing polymerization toward as complete as possible a formation of 1,2 and/or 3,4 structural units.

The cocatalyst is generally selected from the group of ethers, tertiary amines and tertiary amines containing ether groups. Mixtures of different co-catalysts may also be employed.

Suitable ethers are, in particular, symmetrical and asymmetrical dialkyl glycol ethers of ethyleneglycol and diethylene glycol, their alkyl groups each comprising up to 4 carbon atoms, such as ethyleneglycol diethyl ether (DEE).

Suitable tertiary amines are, for example, N,N,N',N'-tetramethylethylenediamine, N,N,N',N'-tetraethylethylenediamine and triethylenediamine.

Suitable amines containing ether groups are N-methylmorpholine and N-ethylmorpholine.

The cocatalyst is employed in a ratio of 2:1 to 50:1, in particular 2:1 to 30:1 based on the moles of the catalyst. At higher temperatures larger quantities of cocatalyst are generally required in order to attain the desired microstructure control. Reaction temperatures of 100° C. not be exceeded. It is possible, also, to operate at rising or falling temperatures; in this case, however, care must be taken that the microstructure does not suffer fundamental change.

In the production of block A, the desired vinyl group content, determines how much cocatalyst is to be present.

In the production of the AB block copolymers, care must be taken to ensure that the content of polystyrene blocks does not exceed 3% by weight. A process for determining the content of polystyrene blocks is described in the textbook Houben-Weyl "Methoden der Organischen Chemie", Vol. 14/1 (1061), page 698.

It is known that certain compounds proposed as cocatalysts have the property of suppressing the formation of polystyrene blocks. The same property is present in compounds which are known as randomizers and which are usually potassium salts of alcoholates, as well as organic carboxylic and sulfonic acids.

In accordance with a particular embodiment of the process, the "live polymers" present at the end of the polymerization can be converted into branched or star-shaped block copolymers with a coupling agent.

Suitable coupling agents are polyepoxides such as epoxidized linseed oil, polyisocyanates, polyketones such as 1,3,6-hexanetrione, polyanhydrides, for example the dianhydride of pyromellitic acid and dicarboxylic acid esters such as adipic acid dimethylester.

Particularly suitable are the tetrahalides of the elements Si, Ge, Sn and Pb, in particular $SiCl_4$; organic compounds of the general formula $R_n[SiHal_3]_n$, where $n = 1$ to 6, in particular $n = 1$ and 2. In this context R is an organic moiety having a valency of n, for example an aliphatic, cycloaliphatic or aromatic moiety having 6-16 carbon atoms. 1,2,4-Tris(2-moiety trichlorosilylethyl)cyclohexane, 1,8- bis(trichlorosilyl)octane and 1-(trichlorosilyl)octane are preferred examples; organic compounds which contain at least one of the moiety $SiHal_2$, e.g. dimethylsilylchloride as well as halogen hydrosilanes of the general formula $Si(H)_m(Hal)_{4-m}$ where m is from 3 to 1 and di- and trivinylbenzenes, e.g. 1,4-divinylbenzene are also suitable coupling agents.

It was found to be particularly advantageous to use divinyl benzene as a coupling agent.

The process may be conducted discontinuously as well as continuously.

The person skilled in the art will be able, by means of the damping curve, to produce block copolymers which can be processed into tire treads having the desired combinations of properties by varying the reaction conditions.

The amorphous polymers obtained can be mixed with active reinforcing fillers, a vulcanizing agent and conventional additives if they are to be converted into vulcanization products. Generally speaking, it is necessary to carry out such mixing in the presence of shear force effects.

Compositions which are intended for the manufacture of tire treads are generally formed as camelbacks. During the homogenization and molding which may, for example, take place in an extruder the conditions of temperature and time are so selected that no vulcanization takes place.

The rubber component in the vulcanizable compositions may, for example, comprise more than 20 and in particular 100 wt. % of a block copolymer according to the invention and 0 to 80 wt. % of a known amorphous general purpose rubber, e.g. styrene-butadiene rubber, 1,4-cis-polybutadiene, 1,4-cispolyisoprene and natural rubber.

Active reinforcing fillers are, for example, tire tread carbon black compositions of various activities, optionally treated with silane bonding agents, highly dispersed silicic acids and mixtures thereof.

Conventional vulcanizing agents contain, e.g. sulphur, in combination with accelerators. The amount of vulcanizing agents depends on the remaining components in the vulcanizable composition and can be determined by simple preliminary tests.

Plasticizer oils as conventionally used in rubber technology, preferably aromatic, aliphatic and naphtenic hydrocarbons and conventional auxiliaries, for example zinc oxide, stearic acid, rosin acids, aging protective agents and ozone protective waxes may serve as additives, added in conventional quantities.

The block copolymers according to the invention, are suitable for the manufacture of tire treads for automobile tires and truck tires, not only for the manufacture of new tires, but also for the retreading of old tires.

The tire treads are characterized in particular by the following advantageous properties:
high skid resistance under wet conditions,
high abrasion resistance,
low rolling resistance and thus low fuel,
consumption,
high wear resistance, and
all-weather suitability.

Other features of the invention will become apparent in the course of the following descriptions of exemplary embodiments which are given for illustration of the invention and are not intended to be limiting thereof.

EXAMPLES

A hydrocarbon mixture comprising about 50% hexane was employed as the solvent. Additional components of this hydrogenated C6 fraction were in particular pentane, heptane and octane and their isomers. The solvent was dried over a molecular sieve of pore size 0.4 nm, such that the water content was lowered below 10 ppm, and $N_2$ was then bubbled through the solvent.

The organolithium compound was n-butyllithium which, unless stated otherwise, was employed in the form of a 15 wt. % solution in hexane.

The monomers isoprene and styrene were distilled from the stabilizer prior to use, and titrated to the end point with n-butyllithium in the presence of o-phenanthroline.

The glycol ethers were dried over a molecular sieve and subsequently treated to the end point which n-butyllithium in the presence of o-phenanthroline.

The divinyl benzene (DVB) was present as a mixture of m- and p-divinylbenzene and was employed in the form of a 64% solution in hexane. The extent of conversion was determined by determining the solids content after evaporating off the solvent and the monomers.

The damping curves were determined with a torsion pendulum according to Schmieder Wolf as set out in DIN 53 520. The microstructure was determined IR spectroscopy.

The coupling yield is considered to be the percentage of rubber which after the conversion with a coupling agent comprises a star-shaped structure and is characterized by a considerably higher molecular weight as compared with the non-coupled rubber. This is determined by GPC analysis, tetrahydrofuran being used as solvent and polystyrene as the column material. The polymers are characterized by means of a light scattering detector. For that purpose, samples are taken from the reactor prior to the addition of the coupling agent and also toward the end of the reaction. The Defo hardness (DH) and the Defo elasticity (DE) were determined by conventional measuring methods (DIN 53 514).

Parts are given in terms of parts by wt., percentages (%) are expressed in terms of wt. %.

EXAMPLE 1

680 parts hexane (technical C6 cut), 67 parts 1.3-butadiene, 26 parts isoprene and 7 parts styrene were initially introduced into a V2A strainless steel agitating autoclave rinsed with nitrogen and titrated with N- butyl lithium (BuLi) with thermoelectric control. The polymerization was started at 50° C. by the addition of 0.038 parts n-BuLi and kept almost constant by cooling. After 33 minutes a sample was taken on which the conversion was determined to be 54% and the microstructure was measured (block A).

Immediately thereafter, 1.0 parts 1.2 diethoxy ethane were added. The temperature rose to 58° C. After 2.5 hours the polymerization was complete solution of 0.5 parts 2,2'-methylene-bis-(4-methyl-6-tert.-butylphenol) in two parts moist toluene were added. The solvent was distilled off with steam, and the polymerization product was dried for 24 hours at 70° in a circulatory drying cabinet.

EXAMPLE 2 to 6

The test conditions corresponded substantially to Example 1. The varied amounts of starting material and reaction parameters are shown in Table 1.

COMPARATIVE EXAMPLES A, B and C

In these comparative examples only butadiene and styrene were employed as monomers. The process of the polymerization was substantially the same as in Example 1. The experimental details are given in Tables 1 and 2, the properties of the rubbers obtained are given in Tables 3 and 4.

Comparative Example B corresponds to Example K of DE PS 31 51 129. Comparative Example C corresponds to Example 2 of DE PS 32 20 680.

It is apparent from these tables that the AB-block copolymers according to the invention are characterized in particular by a lower abrasion as well as a more favorable relation of skid resistance to rolling resistance (apparent from the values of rebound elasticity at 22° C. and at 75° C.).

TABLE 2

Percentage content of structural elements obtained by polymerization of the following monomers.

| | Butadiene | | | Isoprene | | Styrene |
|---|---|---|---|---|---|---|
| | trans 1,4 | 1,2*) | cis 1,4 | 3,4 | 1,4 | |
| Example 1 | | | | | | |
| A | 48 | 13 | 29 | 2 | 7 | 1 |
| AB | 24 | 30 | 15 | 19 | 4 | 8 |
| Example 2 | | | | | | |
| A | 37 | 10 | 21 | 5 | 20 | 7 |
| AB | 25 | 19 | 18 | 10 | 3 | 25 |
| Example 3 | | | | | | |
| A | 34 | 17 | 19 | 11 | 15 | 4 |
| AB | 25 | 17 | 15 | 22 | 11 | 10 |
| Example 4 | | | | | | |
| A | 29 | 6 | 12 | 6 | 39 | 8 |
| AB | 17 | 7 | 9 | 19 | 21 | 27 |
| Example 5 | | | | | | |
| A | 41 | 13 | 23 | 5 | 14 | 5 |
| AB | 26 | 14 | 16 | 16 | 10 | 18 |
| Example 6 | | | | | | |
| A | 43 | 12 | 27 | 4 | 10 | 4 |
| AB | 23 | 18 | 14 | 20 | 7 | 18 |
| Comp. Example A | | | | | | |
| A | 50 | 16 | 32 | 0 | 0 | 2 |
| AB | 23 | 39 | 14 | 0 | 0 | 24 |
| Comp. Example B | | | | | | |
| A | 43 | 29 | 28 | 0 | 0 | 0 |
| AB | 25 | 37 | 17 | 0 | 0 | 21 |
| Comp. Example C | | | | | | |
| A | 40 | 21 | 29 | 0 | 0 | 0 |
| AB | 21 | 40 | 14 | 0 | 0 | 25 |

*)including 1,2-isoprene

TABLE 3

Characterization of the AB-block copolymers

| | Example | | | | | | | | |
|---|---|---|---|---|---|---|---|---|---|
| | 1 | 2 | 3 | 4 | 5 | 6 | A | B | C |
| Block A (%) | 54 | 56 | 70 | 50 | 70 | 60 | 39 | 50 | 33.4 |
| B (%)[1] | 46 | 44 | 30 | 50 | 30 | 40 | 61 | 50 | 66.6 |
| Mooney-viscosity DE | — | 32 | 28 | 22 | 25 | 20 | 24 | 24 | 21 |
| Block styrene | | 1.8 | | 1.6 | 0.95 | | | 1.7 | |

TABLE 1

| Pre-introduced materials for Block A | Example | | | | | | | |
|---|---|---|---|---|---|---|---|---|
| | 2 | 3 | 4 | 5 | 6 | A | B | C |
| Parts hexane | 470 | 470 | 470 | 470 | 470 | 560 | 280[1] | 280[1] |
| Parts butadiene | 40 | 50 | 26 | 50 | 50 | 77 | 50 | 33.4 |
| Parts isoprene | 36 | 42 | 50 | 34 | 34 | — | — | — |
| Parts styrene | 24 | 8 | 24 | 16 | 16 | 23 | — | — |
| Parts DVB | 0.025 | 0.002 | 0.025 | 0.02 | 0.02 | 0.015 | 0.010 | — |
| Start with Parts BuLi | 0.034 | 0.04 | 0.042 | 0.04 | 0.042 | 0.044 | 0.045 | 0.056 |
| at temp. (°C.) | 49 | 50 | 49 | 51 | 50 | 50 | 50 | 50 |
| Start of Block B after minutes | 25 | 138 | 65 | 145 | 110 | 50 | 150 | 136 |
| Conversation (%)*) | 56 | 70 | 50 | 70 | 60 | 39 | 100 | 99 |
| by addition of parts cocatalyst[2] | 0.75 | 0.75 | 0.75 | 0.75 | 0.75 | 0.75 | 0.75[4] | 0.4[4] |
| and parts butadiene/styrene | — | — | — | — | — | — | 30/20[3] | 43.2/23.4[5] |
| End of the polymerization after hours | 1.5 | 3 | 2.5 | 3.5 | 3 | 2.5 | 4.5 | 2.5[6] |
| at temperature (°C.) | 66 | 53 | 56 | 53 | 60 | 56 | 51 | 51 |

*)Percentage proportion of introduced monomers present as polymer
[1]The reaction mixture for block A also contains 0.012 parts 1-ethoxy-2-t.butoxyethane (BEE) as cocatalyst.
[2]BEE was used as cocatalyst.
[3]The mixture of 30 parts of butadiene and 20 parts styrene was added in the form of a solution in 200 parts hexane.
[4]In addition to the cocatalyst, 0.1 parts sodium alkylbenzene sulphate (molecular weight 346) were employed.
[5]The mixture of 43.2 parts butadiene and 23.4 parts styrene was added to a solution in 200 parts hexane.
[6]After the end of the polymerization 8.1 g SnCl$_4$ were added and kept for 60 minutes at 60° C.

TABLE 3-continued

Characterization of the AB-block copolymers

| | Example 1 | 2 | 3 | 4 | 5 | 6 | A | B | C |
|---|---|---|---|---|---|---|---|---|---|
| (%) | | | | | | | | | |

[1] calculated.

Composition of the polymerization product in %:

| Butadiene | | | Isoprene | | Styrene |
|---|---|---|---|---|---|
| trans-1,4 | 1,2 | cis-1,4 | 3,4 | 1,4 | |
| 24 | 12 | 15 | 11 | 12 | 26 |

TABLE 4

Rubber properties

| | Example 2 | Example 5 | Example 6 | Comp. Example A | Comp. Example B | Comp. Example C |
|---|---|---|---|---|---|---|
| ML[1] | 84 | 93 | 72 | 75 | 75 | 59 |
| Defo[2] | 1700/18 | 1900/15 | 1200/12 | | 1700/12 | 1025/17 |
| $t_{10}$[3] | 9.4 | 10 | 10.5 | 13.7 | 11.3 | 10.7 |
| $t_{90}$[3] | 14.5 | 15.4 | 16.3 | 22.9 | 28.0 | 19.3 |
| F[4] | 17.8 | 17.3 | 16.0 | 15.6 | 15.7 | 15.5 |
| D[5] | 482 | 445 | 462 | 401 | 451 | 432 |
| $M_{100}$[6] | 2.8 | 2.7 | 2.1 | 2.7 | 2.7 | 2.0 |
| $M_{300}$[6] | 10.6 | 10.9 | 9.3 | 11.5 | 10.0 | 9.2 |
| $H_{22°}$[7] | 73 | 72 | 67 | 72 | 72 | 65 |
| $H_{75°}$[7] | 59 | 66 | 57 | 58 | 56 | 55 |
| E-20°[8] | 23 | | 15 | 13 | 19 | 19 |
| 0° C.[8] | 19 | | 10 | 12 | 18 | 9 |
| 22° C.[8] | 14 | 16 | 23 | 29 | 20 | 20 |
| 75° C.[8] | 51 | 55 | 58 | 50 | 48 | 46 |
| Abrasion[9] | 152 | 124 | 134 | 169 | 163 | 153 |

[1] Mooney viscosity ($ML_{1+4}$, 100° C., DIN 53 523)
[2] Defo hardness according to DIN 53 514
Defo elasticity according to DIN 53 514
[3] Vulcametry according to DIN 53 529 in minutes
[4] Tensile strength MPa according to DIN 53 504
[5] Tear stretching in % according to DIN 53 504
[6] Tensile force (MPa) at 100% and 300% extension according to DIN 53 504
[7] Hardness (Shore A) according to DIN 53 505 in % at the given angle
[8] Rebound elasticity according to DIN 53 512 in % at the given temperature
[9] Abrasion according to DIN 53 516 in $mm^3$

EXAMPLE 7

654 parts hexane and a monomer mixture of 50 parts butadiene, 26 parts isoprene and 24 parts styrene were pre-introduced into a V2A autoclave rinsed with dry nitrogen. Heating then proceeded to 50° C. followed by titration with a 5% solution of n-butyl lithium in hexane with thermoelectric control. The polymerization was started at 50° C. with the addition of 0.069 parts n-butyl lithium. The temperature was kept constant by cooling. After 51% of the pre-introduced monomer mixture had been converted, 1.0 parts 1-ethoxy-2-tert.-butoxy-ethane were metered in and the batch was kept at 50° C. for 70 minutes.

Thereafter a sample was taken and complete conversion was established; then 1.4 parts DVB were added at 50° C. After 1 hour at 50° C. cooling took place at room temperature and 0.5 parts 2,2'-methylene-bis-(4-methyl-6-tert.-butylphenol) were added. The rubber obtained was precipitated with a mixture of isopropanol and methanol in a ratio by volume of 80:20 and dried for 24 hours at 70° C. in a circulatory air cabinet.

The evaluation of the GPC analysis showed that 75% of the polymers were present in coupled form. The molecular weight of the coupled product was 8 times as large as that of the non-coupled product.

Obviously numerous modifications and variations of the invention are possible in light of the above teachings. It is therefore to be understood that within the scope of the appended claims, the invention may be practiced otherwise than as specifically described herein.

What is claimed as new and desired to be secured by letters patent of the United States is:

1. An unsaturated elastomeric AB block copolymer comprising:
   20 to 75 wt.% 1,3-butadiene monomer units;
   5 to 50 wt.% isoprene monomer units; and
   3 to 30% wt.% styrene monomer units;
wherein said copolymer contains less than 3 wt.% styrene blocks, wherein each of said block A and block B contain all three of said monomer units and wherein said copolymer comprises 30 to 90 wt.% of block A and 70 to 10 wt.% of block B, and wherein the average vinyl and isopropenyl content of block B are each at least 30% higher than those of block A.

2. The AB-block copolymer of claim 1, wherein the average vinyl and isopropenyl group content of block B is each at least 45% higher than of block A.

3. The AB block copolymer of claim 1, wherein said block copolymer comprises of 40 to 80 wt.% of block A and 60 to 20 wt.% of block B.

4. The AB block copolymer of claim 1, wherein the content of vinyl and isopropenyl groups in block A is 10 to 30%.

5. The AB block copolymer of claim 1, wherein said block copolymer is branched.

6. The AB block copolymer of claim 1, wherein said block copolymer has a Mooney viscosity of 35-120 and a non-uniformity of 0.6-3.0.

7. The AB block copolymer of claim 1, further comprising 0-80 wt.% of an amorphous rubber.

8. The AB block copolymer of claim 7, wherein said amorphous rubber is selected from the group consisting of a styrene-butadiene rubber, 1,4-cis-polybutadiene, 1,4-cis-polyisoprene and natural rubber.

* * * * *